Figure 1:
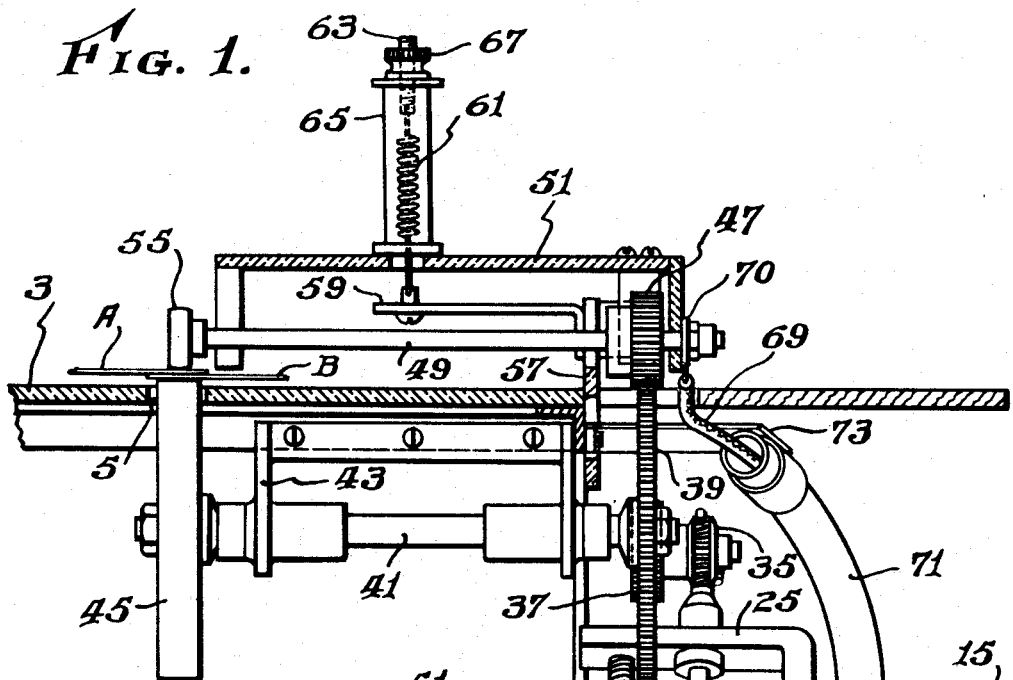

Oct. 10, 1950 — C. N. HOYLER — 2,525,355
METHOD OF BONDING MATERIALS ELECTRICALLY
Filed Feb. 27, 1943 — 5 Sheets-Sheet 1

Inventor
Cyril N. Hoyler
Attorney

Oct. 10, 1950

C. N. HOYLER 2,525,355

METHOD OF BONDING MATERIALS ELECTRICALLY

Filed Feb. 27, 1943

5 Sheets-Sheet 2

Inventor
Cyril N. Hoyler

Oct. 10, 1950  C. N. HOYLER  2,525,355
METHOD OF BONDING MATERIALS ELECTRICALLY
Filed Feb. 27, 1943  5 Sheets-Sheet 3
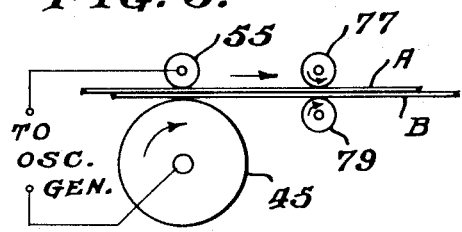
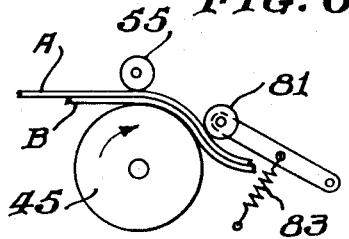
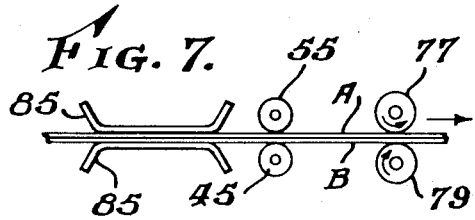
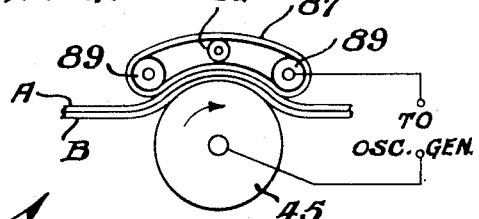
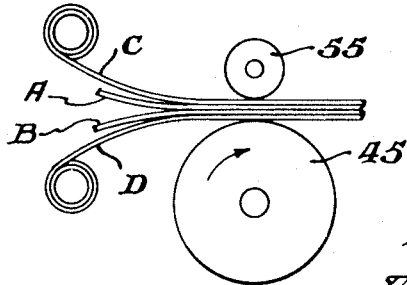
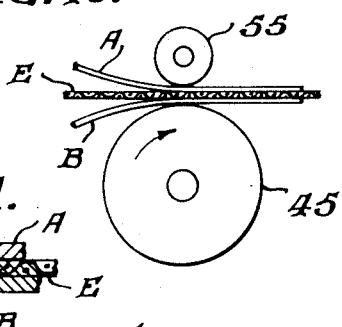
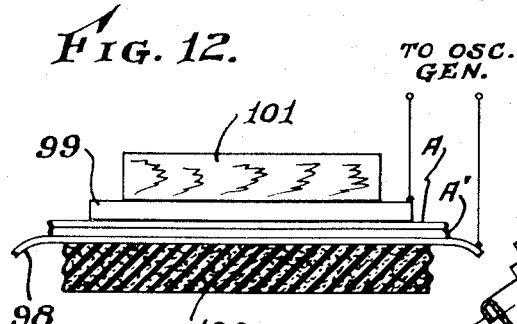
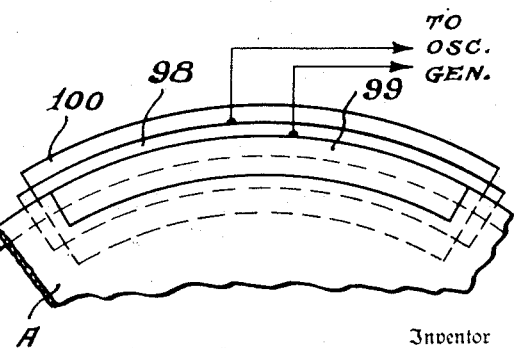
Inventor
Cyril N. Hoyler
By C.D. Tuska
Attorney Oct. 10, 1950     C. N. HOYLER     2,525,355
METHOD OF BONDING MATERIALS ELECTRICALLY
Filed Feb. 27, 1943     5 Sheets-Sheet 4
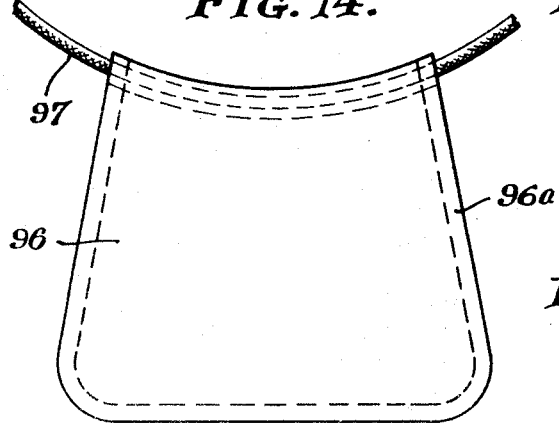
Fig. 14.
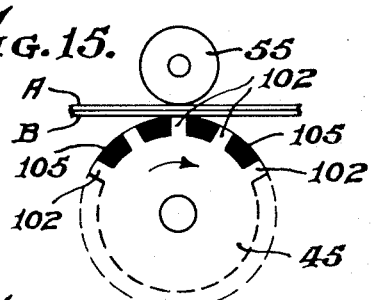
Fig. 15.
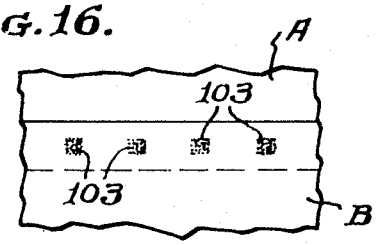
Fig. 16.
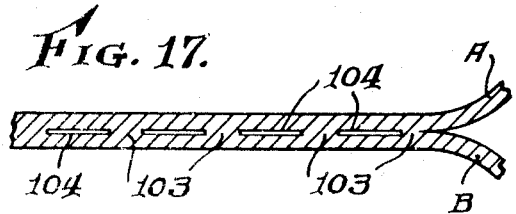
Fig. 17.
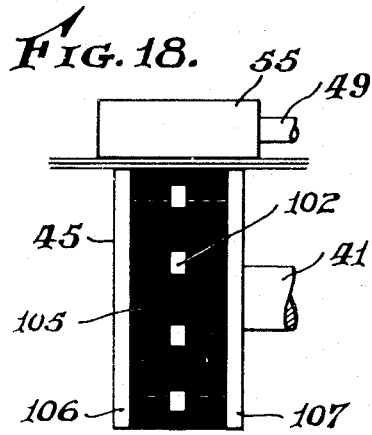
Fig. 18.
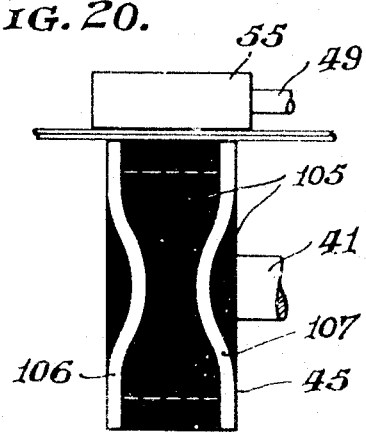
Fig. 20.
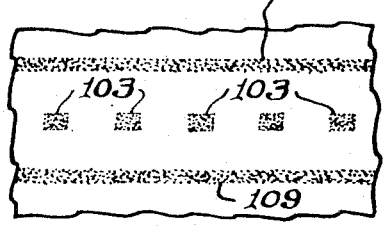
Fig. 19.
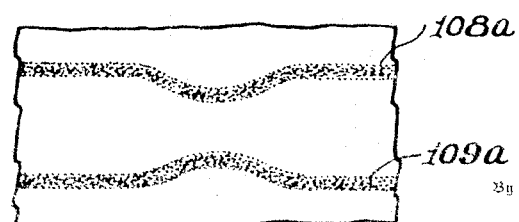
Fig. 21.
Inventor
Cyril N. Hoyler
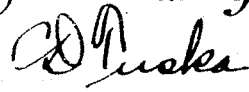
Attorney Oct. 10, 1950 — C. N. HOYLER — 2,525,355
METHOD OF BONDING MATERIALS ELECTRICALLY
Filed Feb. 27, 1943 — 5 Sheets-Sheet 5

Inventor
Cyril N. Hoyler
By C. D. Tuska
Attorney

Patented Oct. 10, 1950

2,525,355

UNITED STATES PATENT OFFICE 2,525,355

METHOD OF BONDING MATERIALS ELECTRICALLY

Cyril N. Hoyler, Princeton, N. J., assignor to Radio Corporation of America, a corporation of Delaware Application February 27, 1943, Serial No. 477,478

10 Claims. (Cl. 154—126.5)

This invention relates to a method of and apparatus for bonding materials electrically, and more particularly to electronic apparatus for sealing together two or more parts or layers of material at least one of which is thermoplastic in nature and is rendered tacky when heated, together with the method involved in the utilization of such apparatus. The present invention is in the nature of an electronic "sewing machine" in that it may be utilized for uniting two or more layers of material with seam-like bonds to provide either continuous or broken "seams," as may be desired, whereby the parts are joined together.

It has been known, heretofore, to bond together two or more layers of thermoplastic material by the use of heat. For example, in the manufacture of rubber or rubberized raincoats, it is fairly common practice to unite two or more contacting layers of material by passing a heated roller thereover, or by subjecting the layers to pressure between heated plates. To effect a suitable bond, it is necessary that the heat penetrate through the layers to the contacting surfaces of the materials so that these surfaces will become plastic. Obviously, if the heat is applied to the several layers through the external surfaces thereof in a degree or quantity sufficient to render the contacting surfaces thereof plastic, the relatively outer portions of these layers also become sufficiently hot to render them plastic, and even hotter. As a result, considerable difficulty has been encountered in the prior art in avoiding sticking of the material to the rollers or plates by means of which the heat is applied to the work. In many instances in the prior art, where sticking of the material to the rollers or the like has not been encountered, it has been found that much of the heat is conducted away through the applicators to the atmosphere instead of concentrating it in the work, thereby greatly reducing the efficiency of operation.

The primary object of my present invention is to provide an improved method of and apparatus for heat sealing plastic and the like materials which will be entirely free from the above mentioned and other similar objectionable features found in prior art methods and apparatus.

More particularly, it is an object of my present invention to provide an improved method of and apparatus for heat sealing two or more parts of which at least one is rendered plastic and tacky when heated to a certain temperature whereby the heat applied to the work will be concentrated in or confined very largely to the regions of the parts contiguous to the contacting surfaces thereof.

Another object of my present invention is to provide an improved method of and apparatus for uniting or bonding together two or more layers of materials at least one of which is rendered tacky under the influence of heat, the method being such that the bond can be effected thereby either along a continuous "seam," as in conventional sewing machines employing stitches, or along a broken seam, as may be desired.

Still another object of my present invention is to provide an improved method of and apparatus for bonding materials as aforesaid by means of which parts of any desired form or configuration can be readily bonded together.

A further object of my present invention is to provide an improved method of and apparatus for bonding materials as above set forth which readily lends itself to various fields of use, such as in the manufacture of clothing, in the packaging industry, in the manufacture of inflatable articles, etc.

It is also an object of my present invention to provide an improved method of and apparatus for bonding materials as above set forth which are simple to practice and utilize, even by one unskilled in the art, which are economical commercially, and which are highly efficient in use.

In accordance with my present invention, I make use of a high frequency electric field for developing heat in the parts to be bonded together, at least one of which is preferably a dielectric material which becomes plastic when heated to a certain temperature. The material or parts to be bonded together are passed between one or more pairs of cooperating electrodes which terminate a high frequency oscillation generator, the generator serving to set up between the electrodes a high frequency electric field which heats the thermoplastic material to plasticity by reason of the dielectric losses therein. The electrodes may be in the form of heat conductive rollers of such mass that they can conduct away through the outer surfaces of the contacting layers to be bonded together the heat developed therein in a region remote from the contacting surfaces thereof. In this way, the heat developed in the contacting parts is concentrated in or largely confined to the regions thereof which are contiguous to their contacting surfaces, so that only the latter regions will become plastic, but the relatively outer portions of the parts being bonded will not become plastic. Suitable means may be provided whereby the rollers will apply pressure to the material while it is plastic or tacky for completing the bond, and either the same or other, additional rollers may be utilized to feed the parts past the operating station where the heat is induced therein.

Figure 3:
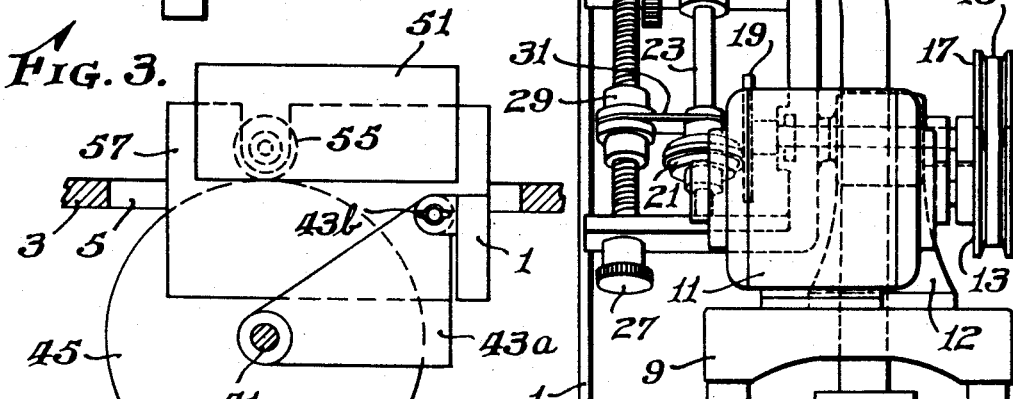
Figure 4:
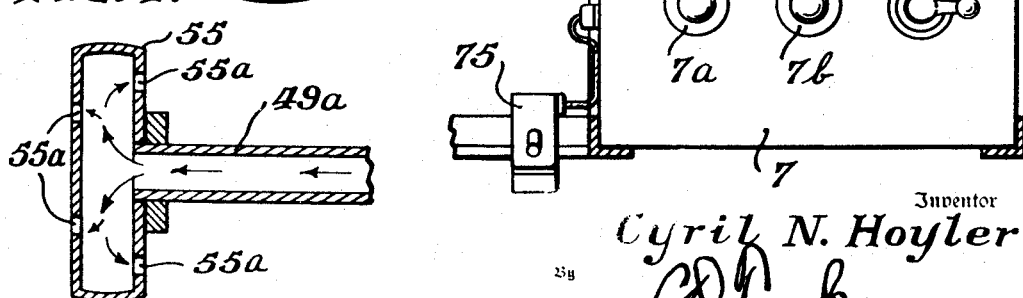
Figure 2:
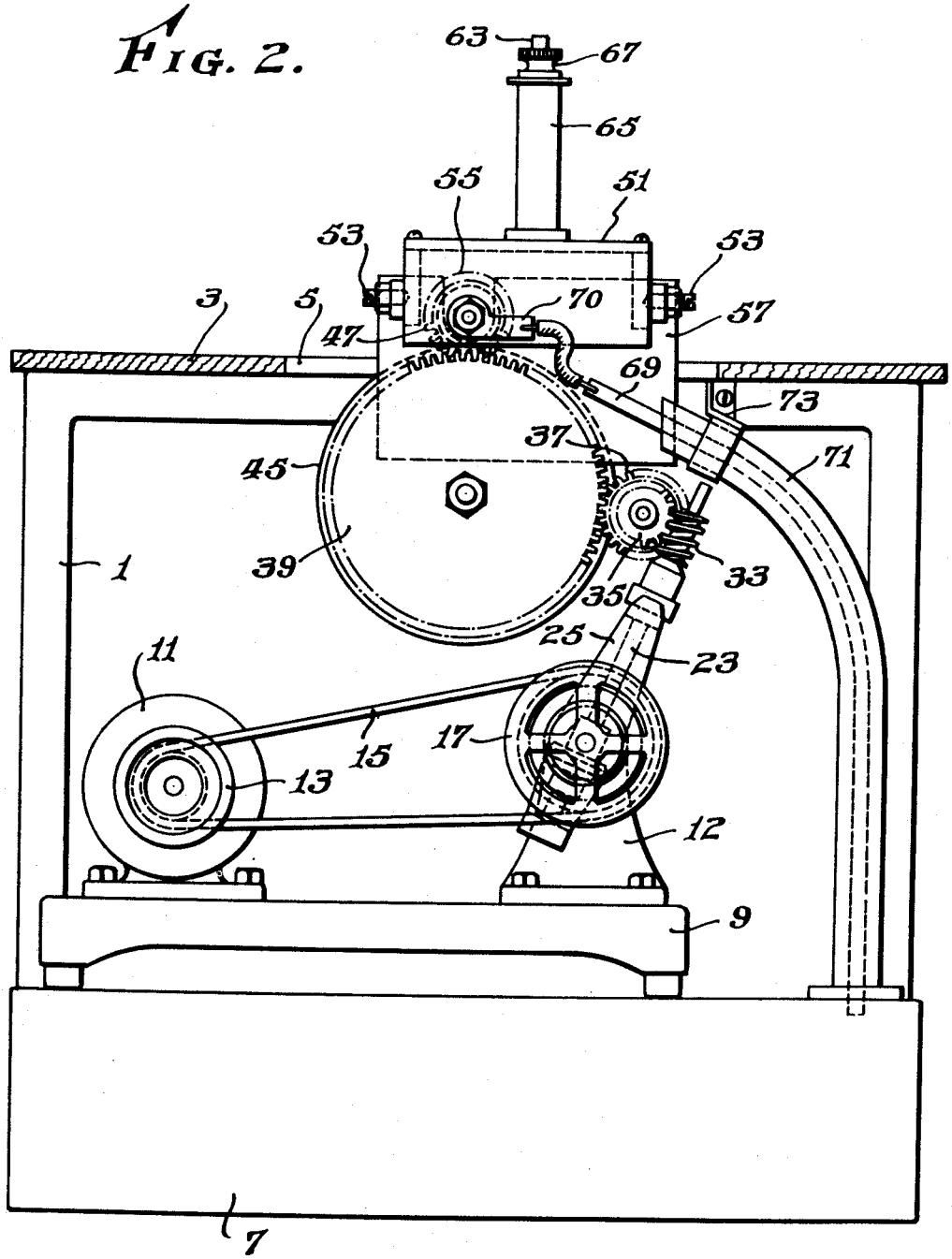

The novel features that I consider characteristic of my invention are set forth with particularity in the appended claims. The invention itself, however, both as to its organization and method of operation, as well as additional objects and advantages thereof, will best be understood from the following description of several embodiments thereof, when read in connection with the accompanying drawings, in which:

Figure 1 is a front elevational view, partly in section, of one form of apparatus constructed according to the present invention, Figure 2 is a side elevation thereof as seen from the right of Figure 1, Figure 3 is a fragmentary, detailed view of a modified form of roller mounting, Figure 4 is a sectional, detailed view of a modified form of roller forming a part of this apparatus, Figures 5 to 10, inclusive, are diagrammatic views showing various forms of electrode arrangements and other modifications of the present invention.

Figure 22:
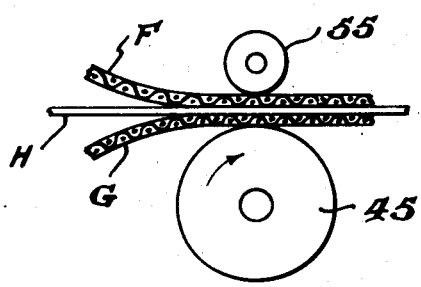
Figure 23:
Figure 27:
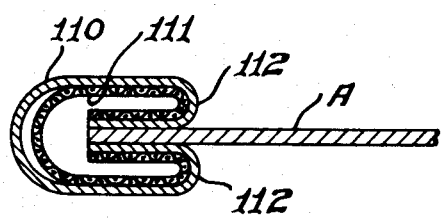

Figure 11 is a fragmentary sectional view of a composite part formed according to the method and apparatus illustrated in Figure 10, Figure 12 is a view partly in elevation and partly in section of another embodiment of the present invention, Figure 13 is a plan view of the apparatus shown in Figure 12, Figure 14 is a plan view of an article that may be formed according to the present invention, Figure 15 is an end elevation of still another form of apparatus embodying the present invention, Figures 16 and 17 are, respectively, fragmentary top plan and sectional views of a composite article formed by the apparatus of Figure 15, Figures 18 and 20 are front elevational views of still further modifications of the present invention, Figures 19 and 21 are fragmentary plan views of composite articles formed, respectively, by the apparatus of Figures 18 and 20, Figure 22 is a diagrammatic view illustrating the application of my present invention to a somewhat different form of composite article, Figure 23 is a fragmentary sectional view of the composite article made according to the method and apparatus of Figure 22, Figures 24, 25 and 26 are, respectively, a side elevation, a front elevation, and a top plan view of still another form of apparatus and method based upon the present invention, and Figure 27 is a fragmentary sectional view of an additional composite article formed according to the present invention.

Referring more particularly to the drawings, wherein similar reference characters designate corresponding parts throughout, there is shown, in Figures 1 and 2, a metallic stand 1 having a work supporting table or top 3 which may be of insulating material or a grounded metal plate, and which is provided with an opening 5. Supported on and electrically grounded to the stand 1 is an oscillation generator 7 of any suitable type for supplying high frequency energy. Upon the casing of the oscillation generator 7 rests a supporting base 9 on which are mounted a motor 11 and a standard 12. The motor 11 includes a driving pulley 13 which is coupled by a belt 15 to a driven pulley 17 on the standard 12.

Fixed to the same shaft which carries the driven pulley 17 is a friction disk 19 with which mates a friction wheel 21. The wheel 21 is keyed to and slidable on a shaft 23 carried by a bracket 25 on the standard 12 and is adjustable longitudinally along the shaft 23 by means of an adjusting screw 27 which carries an internally threaded sleeve 29 connected to the friction wheel 21 by an arm 31. By manipulating the screw 27 one way or the other, the driven friction wheel 21 may be adjusted radially along the friction driving disk 19 and to one side or the other of the center of the disk 19 whereby to vary the speed and direction of rotation of the shaft 23.

On the upper end of the shaft 23 is a worm 33 which meshes with a pinion 35 on the same shaft as a second pinion 37 which meshes with a large gear 39 on a shaft 41. The shaft 41 is rotatably carried by a bracket 43 fixed to the upper portion of the frame 1 immediately under the top 3. A relatively large, massive, metallic roller 45 having good heat and electrical conductivity is fixed to the shaft 41 and extends up through the opening 5 so that its upper, peripheral portion is above the top 3. The roller 45 constitutes one of the operating electrodes and is electrically connected to ground by connection with the frame 1 through the shaft 41 and the bracket 43.

The gear 39 meshes with a gear 47 on a shaft 49 which is rotatably carried by an insulated frame 51 above the work table or top 3. The frame 51 is pivotally mounted on a pair of set screws or adjustable trunnions 53 for movement in a vertical plane away from and toward the roller electrode 45. Cooperating peripherally with the electrode 45 is a second roller electrode 55 fixed to the shaft 49, the roller 55 being smaller than the roller 45 but nevertheless also being of substantial mass and made of good heat and electrically conductive material, such as metal. Secured to the upper portion of the frame 1 and extending up past the top 3 is an insulated plate 57 on which the trunnions 53 may be mounted and to which is fixed a bracket 59. A coil spring 61 connects the bracket 59 with a screw 63 which may be adjusted on a tubular support 65 by means of a cooperating nut 67. The tube 65 is secured to the frame 51, whereby the spring 61 constantly tends to bring the frame 51 down toward the bracket 59 and the roller 55 into engagement with the roller 45. By adjusting the nut 67, the pressure between the rollers 45 and 55 can be regulated.

The oscillation generator 7 is coupled to the rollers 45 and 55 by a concentric line of which the inner conductor 69 is electrically connected to the shaft 49, as by a terminal element 70 secured to the shaft 49, and thereby to the roller 55, and the outer conductor 71 is connected to the frame 1 by a bracket 73. Thus, the rollers 45 and 55 constitute the terminal elements or output electrodes of the oscillation generator 7 and form an electrical condenser when in a separated relation. The oscillation generator 7 and the motor 11 may be coupled to a suitable source of power either through a single foot switch 75 or through separate, independent switches, as may be found most desirable.

The apparatus thus far described may be employed very successfully to bond together two or more layers of dielectric material A and B and at least one of which is a plastic material which becomes tacky when hot. For the sake of illustration, let it be assumed that both of the layers A and B are of the same or similar plastic materials of this type. To bond the layers A and B together, it is merely necessary to bring them into contact with each other and feed them in between the rollers 45 and 55. The composite material A, B may be inserted between the rollers 45 and 55 by raising the frame 51 slightly so as to separate the two rollers, after which the roller 55 is brought down into engagement with the work which now rests on the roller 45. At this point, the nut 67 may be adjusted to provide the desired pressure between the two electrode rollers 55 and 45. The foot switch is then operated to energize the generator 7, whereupon an electric field is established between the peripheries of the two electrodes 45 and 55. This field produces dielectric losses in the layers A, B which serve to heat them. However, the rollers 45 and 55 both have sufficient mass to conduct away through the outer surfaces of the layers A, B (that is, through the upper surface of the layer A and the lower surface of the layer B) the heat developed in the relatively outer regions of the two layers, that is, the heat in the regions thereof contiguous to the respective rollers. As a result, only the regions of the layers A and B which are contiguous to their contacting surfaces will remain hot. This confinement or concentration of the heat in the last mentioned regions of the layers A, B causes the contacting surfaces and the immediately contiguous regions to become plastic and tacky. The pressure applied to the layers A, B by the rollers 45 and 55 then causes the tacky regions to adhere to each other. At the same time, the rollers 45 and 55, rotating in response to the gears 39 and 47, respectively, will feed the composite, joined parts A, B forward and a continuous seam will be formed along the area at which the parts A and B are bonded or joined together under the roller 55.

A machine such as that described above has been used very successfully to bond together various plastic materials, such as those known commercially as "Koroseal" (manufactured by The B. F. Goodrich Company), "Krene" (manufactured by the Carbide and Carbon Chemicals Corporation), "Pliofilm" (manufactured by The Goodyear Tire and Rubber Company), and other similar plastic, dielectric materials, as well as rubber faced fabrics, fabric reinforced rubber sheets, and the like. In the particular machine referred to, the rollers 45 and 55 are both made of steel and are both solid, being, respectively, 6 inches and 1½ inches in diameter. The roller 45 is approximately ⅝ inch thick and the roller 55, which is preferably crowned slightly, is ⅜ inch thick. The gears 39 and 47 are so proportioned that the peripheral speeds of the rollers 45 and 55 are the same.

The power input to the electrodes 45 and 55, the frequency of the energy supplied by the oscillation generator 7, and the speed with which the composite parts A, B are fed between the past the two rollers, as well as the pressure of the rollers on the work, depend upon the nature of the material and the type of bond desired. I have found that the frequency of the energy may vary over a wide range and may be as low as 10 megacycles per second and as high as 100 megacycles per second, or even higher, while the power supplied to the work may vary from as low as 5 watts to as much as 150 watts or more.

The frequency of the oscillator and the power output thereof may be controlled by suitable control elements 7a and 7b on the oscillator casing 7. Similarly, the pressure applied to the work may be as low as 25 pounds per square inch or as high as 300 pounds per square inch, but the pressure should not be too great or it may cause the plastic or tacky regions to spread or ooze out between the rollers. By way of example, it may be stated that, in bonding together two sheets of "Pliofilm" having a thickness of 0.002 inch, the work was fed between the rollers at a speed of about 20 inches per minute and the power supplied to the work was 10 watts at 15 megacycles per second, the pressure between the rollers being approximately 100 pounds per square inch. In other cases, the work was fed past the rollers at speeds up to 50 inches per minute and with various power inputs, at different frequencies, and also at various pressures. Articles such as belts, icebags, hot water bottles and other similar containers, aprons, curtains, raincoats, and inflatable articles such as football bladders, lifeboats, and the like are merely illustrations of the various products that can be bonded together or "sewn" successfully in accordance with the present invention.

In some cases it may be desirable to so mount the rollers 45 and 55 that they are adjustable, as a unit, with respect to the work-supporting member 3, whereby the extent to which the roller 45 protrudes through the opening 3 may be adjusted to suit different working conditions. In such cases, instead of mounting the shaft 41 on the bracket 43 which is fixed to the frame 1, the shaft 41 may be mounted on a bracket 43a which is pivotally mounted on the frame 1, as shown in Figure 3. Here, the plate 57 is not secured to the frame 1 but may also be adjustably mounted thereon so that it can swing with the assembly about the pivot shaft 43b of the bracket 43a as a center. Any suitable locking means (not shown) may be employed to lock the assembly in the adjusted position.

In the apparatus thus far described, the rollers 45 and 55 are of solid stock throughout. Where additional cooling is desired over and above that afforded by the rollers themselves and the surrounding atmosphere, the rollers may be made of hollow construction and supplied with a cooling fluid. By way of example, there is shown in Figure 4 a hollow roller 55 mounted on a hollow shaft 49a through which a suitable cooling fluid may be supplied under pressure, the fluid entering through the hollow shaft 49a and emerging through one or more apertures or openings 55a in either one or both of the end plates of the roller.

Under certain circumstances, it may not be desirable to rely solely upon the electrode rollers 45 and 55 to feed the composite material A, B through the machine, or it may even be deemed advisable not to have the rollers 45 and 55 perform any feeding action at all. In such cases, a pair of auxiliary feed rollers 77, 79 may be provided as shown in Figure 5. If the feed rollers 77 and 79 are placed close to the electrode rollers 45, 55, the former may also be arranged to apply pressure to the heated strips or layers A, B, and in such case, the electrode rollers 45 and 55 may even be stationary.

Sometimes, it may be desirable to have the larger electrode roller 45 acts as a feed roller but not the smaller electrode roller. To cooperate with the roller 45 in feeding the material forward, there may be provided a third roller 81 which is power driven and is preferably constantly urged toward the roller 45 by a coil spring 83. Such an arrangement is illustrated in Figure 6.

With some materials, it may be desirable to preheat the composite part before subjecting it to the electric field between the electrodes 45, 55. For this purpose, one or more pairs of auxiliary electrodes 85 may be provided in advance of the electrodes 45, 55, as shown in Figure 7. The electrodes 85 may or may not be coupled to the same oscillation generator as the electrodes 45, 55, and, in any case, the field between the electrodes 85 may be of different intensity than that between the electrodes 45, 55. Where it is advisable to subject the parts A, B to the electric field between the electrodes 85 for a longer period of time than that between the electrodes 45, 55, the electrodes 85 may be made of relatively elongated, plate-like members. The latter may provide a field of smaller intensity for preheating the work, and the electrodes 45, 55 will provide the final heating by a field of stronger intensity. As in the case of Figure 5, auxiliary feed rollers 77, 79 may be provided to advance the work.

In some cases, the preheating electrodes 85 may not be practical, yet it may be desirable to subject the work to a relatively long heating cycle. For this purpose, a metallic, endless belt 87 may be substituted for the electrode roller 55, as shown in Figure 8. The belt 87 is trained around a pair of conductive rollers 89 spaced from each other a substantial arc over the periphery of the roller 45 whereby the parts A, B are caused to engage the roller 45 over substantially the aforesaid arc. Either one or both of the rollers 89 may be suitably coupled to the shaft 49. An additional pressure roller 91, which may or may not be power driven, is preferably provided between the strands of the belt 87 to apply the requisite pressure to the work.

Occasionally, the material to be bonded is such that arcing may take place therethrough between the two electrodes 45 and 55. Also, in some instances, it may be found that the rollers 45 and 55 draw the heat out of the work too rapidly to permit the inner, contiguous regions thereof to remain tacky long enough to be brought into sufficiently intimate relation for bonding. To overcome these difficulties, the composite layers A, B may be fed past the electrodes between strips of dielectric material C, D, as shown in Figure 9. The materials C and D may or may not be thermoplastic and they may even be of the same materials as the layers A, B. By using the strips C, D, the tendency for arcing is greatly reduced, as is also the tendency for the heat to flow out of the layers A, B. In addition, the tendency for the layers A, B to become deformed somewhat is greatly reduced, thereby providing a seal or seam of greater strength.

The invention has been described thus far with particular emphasis on bonding together two layers of which both are plastic. It is quite possible, however, to employ the present invention equally well for bonding plastic to non-plastic material, or, where a plastic binder is used, to unite two non-plastic materials. The present invention may also be utilized to great advantage in reinforcing one or more thermoplastic layers with one or more non-thermoplastic layers. Thus, in Figure 10, a strip or layer of fabric or other suitable non-thermoplastic material E is placed between the thermoplastic strips A, B and fed therewith between the electrodes 45 and 55. The regions of the layers or strips A and B which are contiguous to the reinforcing strip E become plastic and tacky as above described and the two softened, tacky portions flow into the interstices of the fabric to become united to each other and to the reinforcing strip. The resulting composite part is shown in Figure 11.

Figure 24:
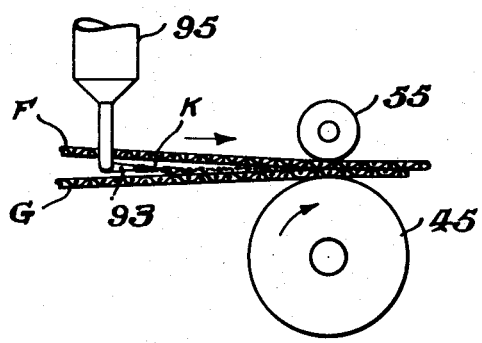
Figure 25:
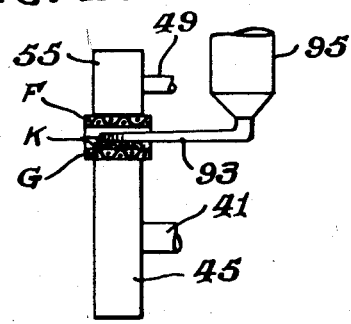
Figure 26:
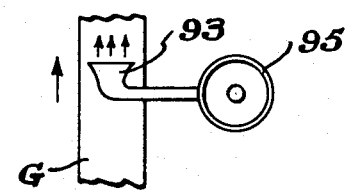

Instead of reinforcing thermoplastic parts as above described, the present invention may be practiced for uniting two or more non-thermoplastic layers with the aid of an intermediate thermoplastic layer, as shown, for example, in Figures 22, 24, 25 and 26. In Figure 22 are shown two fabric or similar non-thermoplastic layers F and G fed between the electrodes 45, 55 with an interposed layer of thermoplastic bonding material H which penetrates into the fabric or like layers F, G when it has become plastic. The resulting, composite, laminated part is shown in Figure 23. Where it is preferred to use the thermoplastic bonding material in the form of a liquid rather than as a solid sheet or layer H, an arrangement such as that illustrated in Figures 24–26 may be employed. Here, the liquid binder K is supplied through a nozzle 93 which is connected to a supply tank 95, the nozzle 93 being disposed between the layers F and G in advance of the electrode rollers 45, 55, as best shown in Figure 24. The binder K may be of either thermoplastic or thermosetting material and is activated by the electric field between the electrodes 45, 55 to render it tacky. The pressure applied by the rollers 45, 55 completes the bond to provide a composite part similar to that shown in Figure 23.

Figure 14 shows, by way of illustration, one article that may be manufactured according to the present invention. The article illustrated is an apron 96 which is made of thermoplastic sheeting and includes a hem 96a and a fabric or other non-thermoplastic tie string 97. The hem 96a is formed by folding the edge of the sheet back on itself and passing the double layer formed thereby between the electrodes 45 and 55 to bond the fold to the body of the apron. At the waist, the tie string 97 is inserted between the body and the fold and the composite assembly is bonded together in the manner shown in Figure 10.

It will be apparent that, in manufacturing the apron, the material must be fed along a path other than a straight line in order to bond the angularly related edges, the curved corners, and the curved waist portion, although at the operating station 45, 55, the work may be fed instantaneously along a straight line. In some cases, it may be more desirable to form the entire hem and waist portion simultaneously. For this purpose, or where long seams of a particular configuration are desired, a pair of stationary electrodes 98 and 99 may be employed as shown in Figures 12 and 13. These electrodes are shaped similarly to the work, or according to the shape of seam desired. The electrode 98 may be a thin, flexible, metallic sheet or foil which is supported on a resilient base 100 of sponge rubber or the like. The electrode 99 preferably is a bar of metal of relatively large mass. The material A with its marginal portion A' folded back on itself to provide a hem, as shown in Figure 13, is placed on the electrode 98 and the electrode 99 is placed over the hem. The entire assembly may be placed in a suitable press and a dielectric block 101 placed on electrode 99. High frequency current is supplied to the electrodes 98, 99 from the generator and pressure is simultaneously applied to the work by the press to complete the bond.

The various forms of the invention thus far described are designed to form continuous seams. In some cases, it may be found desirable to provide a broken or discontinuous seam which, in effect, results in "spot welds," so to speak. For this purpose, either one or both of the roller electrodes 45, 55 may be constructed as shown in Figure 15. In this form of the invention, the roller 45 is formed with a plurality of circumferentially-spaced, radial projections 102 somewhat similar to the teeth of a spur gear. The peripheral portion of each projection 102 cooperates with the periphery of the electrode 55 to form the spaced bonding joints or "spot welds" 103, as shown in Figures 16 and 17, the materials A and B being unbonded between the joints 103, as represented by the somewhat exaggerated air spaces 104 in Figure 17. To insure cutting off the effective electric field between the projections 102 and also to provide an adequate, continuous supporting surface for the work, the spaces between the projections 102 may be filled in with blocks 105 of insulating material.

With the arrangement shown in Figure 15, the joints or bonds 103 are spaced longitudinally along the work or composite part A, B. In some instances, it may be desirable to space the seams or bonded joints transversely across the work. For this purpose, either one or both of the electrode rollers 45, 55 may be formed with circumferentially extending projections 102, 106 and 107, as shown in Figure 18. The projections 102 are similar to those shown in Figure 15, while the projections or ribs 106 and 107 are continuous and extend around the roller 45 in endless fashion, the three rows of projections 102, 106 and 107 being spaced from each other longitudinally along the roller 45. An arrangement of this sort simultaneously forms three rows of seams or bonds 103, 108 and 109, as shown in Figure 19. The three rows of seams 103, 108 and 109 are arranged in parallel relation along straight lines extending longitudinally of the work, the seams or bonds 103 being spaced from each other longitudinally along the work and the seams or bonds 108 and 109 being continuous and spaced from each other and from the seams 103 transversely of the work. Where the seams 108 and 109 are to be formed along a path which departs from a straight line, the projections 108 and 109 may be suitably configured to the desired shape, as shown in Figure 20, and this results in seams or bonds 108a and 109, as shown in Figure 21.

Figure 27 shows how a binding 110 of thermoplastic material may be applied to a thermoplastic sheet A. The binding 110, with an inner filling of fabric or the like 111, is formed with reentrant folds 112 between which the edge of the sheet A is inserted, and the composite assembly is then passed between the electrodes 45 and 55 as above described, whereupon the binding 110, the filler 111 and the sheet A are bonded into one integral unit. Where the binding 110 is of transparent or translucent material, the filler 111 may be of colored material to provide a color contrasting effect.

Although I have shown and described my invention in considerable detail, it will, no doubt, be apparent to those skilled in the art that many other modifications and variations thereof are possible. I therefore desire that my invention shall not be limited except insofar as is made necessary by the prior art and by the spirit of the appended claims.

I claim as my invention:

1. The method of uniting a plurality of layers of contacting, dielectric material at least one of which becomes tacky when heated which comprises subjecting said layers to a series of high frequency electric fields of successively increasing intensity whereby to create dielectric losses therein of successively increasing magnitudes to thereby heat said layers in successive stages, simultaneously cooling the relatively outer portion of at least said one layer whereby to confine the relatively hot portion thereof largely to a region contiguous to the contacting surfaces of said layers to thereby render only substantially said region thereof tacky, and applying pressure to said layers while said region is tacky to cause them to adhere to each other.

2. The method of uniting a plurality of elongated layers of contacting, dielectric material at least one of which becomes tacky when heated to a certain temperature which comprises feeding said layers past an operating station while maintaining said layers in contacting relation, subjecting said layers to a high frequency electric field at said station whereby to create dielectric losses therein to thereby heat said layers, varying the effective intensity of said field between a relatively high value sufficient to heat said one layer to said temperature and a relatively low value insufficient to heat said one layer to said temperature by reason of the dielectric losses created therein in the course of feeding successive portions of said layers to said station whereby to heat to said temperature only those areas of said one layer which are subjected to said relatively high intensity electric field, cooling the relatively outer portion of at least said one layer simultaneously with the heating thereof whereby to confine the relatively hot portion thereof at substantially said temperature largely to a region of each of said heated areas which is contiguous to the contacting surfaces of said layers to thereby leave only substantially said regions thereof tacky, and applying pressure to said layers while said regions are tacky to cause them to adhere to each other at said areas.

3. The method set forth in claim 2 wherein the pressure is applied to said layers simultaneously with the heating of said areas to said temperature.

4. The method set forth in claim 2 wherein said high frequency electric field is applied to said layers at its said high value at spaced points on said layers to thereby render said one layer tacky at only said spaced points.

5. The method set forth in claim 2 wherein said high frequency field is applied to said layers at its said high value only at a plurality of points spaced from each other longitudinally along said layers to thereby render said one layer tacky at only said longitudinally spaced points.

6. The method set forth in claim 2 wherein said high frequency field is applied to said layers at its said high value only at a plurality of points spaced from each other transversely across said layers to thereby render said one layer tacky at only said transversely spaced points.

7. The method set forth in claim 2 wherein said high frequency field is applied to said layers at its said high value only at a plurality of points spaced from each other in the direction of feed of said layers to thereby render said one layer tacky at only said spaced points.

8. The method set forth in claim 2 wherein said high frequency field is applied to said layers at its said high value only at a plurality of points spaced from each other in a direction angularly related to the direction of feed of said layers to thereby render said one layer tacky at only said spaced points.

9. The method set forth in claim 2 wherein said layers are fed past said station along a path which departs from a straight line.

10. The method set forth in claim 2 wherein said high frequency field is applied to said layers along a path which departs from a straight line as said layers are advanced past said station.

CYRIL N. HOYLER.

REFERENCES CITED

The following references are of record in the file of this patent:

UNITED STATES PATENTS

| Number | Name | Date |
|---|---|---|
| 371,315 | Hawley | Oct. 11, 1887 |
| 1,641,173 | Ladd et al. | Sept. 6, 1927 |
| 1,931,629 | Robinson | Oct. 24, 1933 |
| 1,925,509 | Staud et al. | Sept. 5, 1933 |
| 2,097,427 | Bergstein | Nov. 2, 1937 |
| 2,117,452 | Robinson et al. | May 17, 1938 |
| 2,205,582 | Steimel | June 25, 1940 |
| 2,220,545 | Reinhardt | Nov. 5, 1940 |
| 2,288,269 | Crandell | June 30, 1942 |
| 2,319,683 | Hofmann | May 18, 1943 |
| 2,322,298 | Johnston | June 22, 1943 |
| 2,324,068 | Crandell | July 13, 1943 |
| 2,343,975 | Hosfield | Mar. 14, 1944 |
| 2,354,714 | Strickland, Jr. | Aug. 1, 1944 |